Patented Nov. 18, 1941

2,262,776

UNITED STATES PATENT OFFICE 2,262,776

GAS EXPANDED RUBBER

Dudley Roberts, New York, N. Y., assignor to Rubatex Products, Inc., New York, N. Y., a corporation of Delaware No Drawing. Application December 20, 1938, Serial No. 246,803

2 Claims. (Cl. 260—724)

My invention relates to a novel gas expanded product and a novel process of manufacturing the same and more particularly relates to a novel expanded rubber and process for gassing the rubber to eliminate undesirable odors, flame proof the product and increase the sound and heat insulating properties thereof.

In application Serial No. 718,875, filed April 3, 1934, now Patent No. 2,067,020, issued January 5, 1937, of which this application is a continuation in part, I have disclosed a novel expanded rubber and process for manufacturing the same. This application is a continuation in part of application Serial No. 755,464, filed November 30, 1934.

Briefly, the process of my present invention involves new methods for gassing rubber to make gas expanded cellular rubber including both closed cell and open cell rubber. The novel gassing process includes the use of mixtures of gases including nitrogen and ammonia, sulphur dioxide and chlorine. I further contemplate the use of ammonia, sulphur dioxide, chlorine and water vapor gases per se, either for the original gassing of the rubber or for subsequent gas treatment of the rubber to eliminate the odor of the hydrogen sulphide contained within the cells of the mass. These latter gases react with the hydrogen sulphide to produce sulphur compounds with non-objectionable odor.

In the formation of closed cell rubber I propose partially vulcanizing the rubber in the first stage prior to or during the gassing step to give the rubber sufficient strength to maintain its desired closed cell structure.

In the formation of open celled or sponge rubber I prevent such partial vulcanization of the rubber as would cause it to hold the gas within it in the form of closed cells and effect a gassing operation in such a way as to cause ruptured cells and intercommunicating channels through the rubber mass.

Many methods of making open celled sponge rubber have been suggested in the prior art but I have found them deficient from the standpoint of excess of weight because of the chemical blowing agent contained therein, or undesirable from the standpoint of lack of optimum expansion because of insufficient gassing or because of a premature set or cure of the rubber before it reaches the optimum point of expansion. The problem of the respective solubility of the different gases in the rubber and their relation to the open celled or closed cell form of rubber desired are also taken up in the present application.

In the formation of closed cell rubber of the soft or resilient type it is important that the gas employed as a gassing agent or at least a part of that gas be relatively insoluble in the rubber so that it remains within the cells of the rubber. If the gas is one that is relatively soluble in the rubber and therefore diffuses outward from the rubber, it would cause collapse of the cellular structure because of the subatmospheric pressure within the cells. When hard closed cell rubber is made using a high amount of sulphur then this problem does not arise because of the rigidity of the rubber itself which has sufficient strength so that it is self-supporting with or without the gas contained within its cells.

When open celled or sponge rubber is made then since there is free communication between the outside and inside of the rubber structure the gases are always free to pass in or out and the solubility of the gases is unimportant except with respect to its penetration into the rubber to form the internal gassed cellular structure.

The closed cell gas expanded rubber which I produce according to the present process is characterized by a high degree of expansion and therefore an extremely light weight. The hard closed cell material may weigh as little as about three pounds per cubic foot. Soft material may weigh as little as five or six pounds per cubic foot. These materials are characterized by impermeability to water, high degree of insulation with respect to heat and electricity and good strength.

In the manufacture of closed cell rubber in accordance with my invention I contemplate introducing for example a gas such as ammonia mixed with nitrogen gas; the ammonia or the nitrogen may either be introduced simultaneously or successively. When introducing them successively, I prefer to employ first the nitrogen and then the ammonia since the ammonia has an action to effect the acceleration of the vulcanization of the rubber. In addition to externally applying these gases I may incorporate chemicals which decompose and react to evolve nitrogen and ammonia gases. The ammonia reacts with any hydrogen sulphide gas which is developed within the rubber to convert the hydrogen sulphide and therefore to eliminate the objectionable odor.

However, the use of a mixture of ammonia gas with nitrogen has other important advantages over the use of nitrogen gas per se. As will be brought out more specifically hereinafter this mixture of gases has a superior expanding property and, further, the ammonia acts to set the rubber mix at the desired point.

Both closed cell rubber and open celled rubber may be made according to the processes I shall set forth. In the manufacture of closed cell rubber I prefer to employ a mixture of nitrogen and ammonia gases to the rubber gas. As has been set forth this mixture may be injected into the rubber in an autoclave or it may be generated from chemicals included within the rubber. Similarly, I can employ mixtures of nitrogen and chlorine or nitrogen and sulphur dioxide. I have also found that I can get good results by gassing with chlorine alone, in which event the chlorine both expands the rubber and forms cells of gas therein, and at the same time chemically acts with the rubber to convert it to rubber chloride. I may also employ ammonia gas alone as the gassing agent.

When I make closed cell rubber of the soft variety, it is essential that I include as at least one of the gassing agents a gas that is relatively insoluble in the rubber, such a gas being, as for example, nitrogen. If a relatively soluble gas be used alone as the gassing agent, then it tends to diffuse out from the rubber and collapse of the soft structure occurs. When I make closed cell hard rubber, then I may employ a gas that is soluble in the rubber, such as carbon dioxide or ammonia, inasmuch as the rubber itself has sufficient strength, because of its high sulphur content, to form a rigid structure, and the escape of the gas from the cells as by diffusion does not cause collapse of the mass. The relative solubilities of the various gases with the rubber is set forth in the tables below.

*Data from Daynes on the relative solubility of gases in rubber*

| | |
|---|---|
| Hydrogen | 1 |
| Carbon monoxide | 0.2 |
| Nitrogen | 0.18 |
| Carbon dioxide | 2.46 |
| Ammonia | 11.3 |
| Water gas | 47 |
| Oxygen | 0.46 |

*Relative absorption coefficients (carbon dioxide equals 1) for a series of gases*

| | |
|---|---|
| Carbon dioxide | 1.0 |
| Nitrogen | 0.035 |
| Ammonia | 9.39 |
| Sulphur dioxide | 19.7 |
| Hydrogen sulphide | 2.70 |

I also propose the manufacture of open celled sponge rubber according to the following process. I include within the rubber a chemical agent adapted to decompose and evolve a gas such as carbon dioxide, and I may or may not include within the mix retarders of acceleration, such as aldehydes. I then subject the rubber mix to sufficient heat to decompose the blowing agent and cause evolution of gas, the heat being insufficient to effect such a vulcanization of the rubber as will cause it to set. This retardation of vulcanization can be obtained by the use of high temperature accelerators in the rubber mix or by including retarding agents. When the blowing agents are thus decomposed they evolve gas and form a sponge structure within the rubber because the rubber does not have sufficient strength to prevent the rupture of the gas cells within it.

After the rubber has received this blow it is subjected to externally applied gas such as ammonia or nitrogen which acts to further expand it upon its release from such gas pressure. Heat is applied which causes expansion of the gas contained within the rubber to get the optimum expansion and the heat also completes the vulcanization to cure the rubber. When I employ ammonia as this gassing agent, the ammonia assists in the curing of the rubber to get the quick set at its highest point of expansion. When I employ retarders of the aldehyde type such as acetaldehyde, paraformaldehyde and furfuraldehyde, and the like, to prevent premature vulcanization of the rubber I prefer to use ammonia gas as the subsequently applied gas since the ammonia acts to convert the aldehyde to an aldehyde amine which acts as an accelerator to the vulcanization and induces a quick set for the sponge at the point of optimum expansion. There is an added blow induced both in the closed cell rubber and in the open celled or sponge rubber because of the presence of hydrogen sulphide gas which is developed in an exothermic reaction in the rubber when the temperature is in the neighborhood of or above 300° F. This hydrogen sulphide gas which is developed causes a good volumetric blow in the rubber and further is responsible for obnoxious odors of the mass.

To eliminate the odor of the hydrogen sulphide as formed, I have proposed the use of ammonia gas as set forth above. The ammonia reacts with the hydrogen sulphide and forms ammonium sulphide which is non-objectionable in smell and also acts as a flame proofing agent.

I further propose the use of chlorine gas to react with the hydrogen sulphide to eliminate its smell by conversion of the hydrogen sulphide. The chlorine can be externally injected into the rubber or it can be developed by the inclusion within the rubber mass of chemicals adapted to react to produce chlorine gas. As has been stated above this chlorine can be used alone or in combination with other gases. In addition to using chlorine gas, I may use hydrogen chloride gas or similar hydrohalides for the purposes set forth. Alternatively, I may employ sulphur dioxide in this way to react with the hydrogen sulphide and the sulphur dioxide may be externally injected into the rubber as a gas.

Another gas that is valuable especially for the manufacture of sponge or open celled rubber is water vapor gas. Because of its high solubility in the rubber it cannot very well be used in closed cell rubber since it would tend to diffuse out very rapidly. However, it can be employed in the manufacture of sponge and the method I suggest is to effect a preliminary blow of rubber with a blowing agent adapted to release a gas as for example carbon dioxide and follow this gassing or sponging treatment by placing the blown mass in an atmosphere of water vapor such as steam under relatively low pressures as for example 10 to 100 pounds per square inch, whereupon the water vapor gas penetrates the rubber and upon subsequent heating or release of pressure causes a large volumetric expansion. Vulcanization at the end point sets up the expanded sponge rubber.

In the formation of sponge rubber the method I propose is especially advantageous since the second stage, external gassing, not only acts to expand the already formed gas cells within the rubber (the cells which have been set up by the chemical blowing agent) but the externally applied gas penetrates through these established gas channels and impregnates the rubber homogenously and extensively throughout. By reason of this penetration through the established gas channels and openings produced by the blow off of the chemical blowing agent within the rubber, seeds or bubbles of gas are formed to a far greater number than are formed by either gas from a chemical blowing agent itself or gas externally applied of itself, and the present method is also definitely superior to a method in which gas is first externally applied followed by setting off of a chemical blowing agent to effect a further gassing.

This is important because one of the primary problems in obtaining the best possible sponge rubber is to obtain the maximum volumetric expansion since a greater volumetric expansion means less rubber present per unit volume and lighter weight. As has been stated because the present combined blow process comprises first setting off the chemical blowing agent within the rubber to form gas cells and open channels through the rubber to enable the gas externally applied in the second stage to more effectively penetrate the rubber completely throughout its mass, it makes for an entirely new and superior sponge rubber of extreme lightness.

It is, therefore, the object of my invention to provide a novel method of gassing rubber using a mixture comprising nitrogen and ammonia, nitrogen and chlorine, and nitrogen and sulphur dioxide.

It is another object of my invention to provide a novel process of gassing rubber using ammonia, chlorine or water vapor gas per se.

It is a further object of my invention to treat cellular rubber whose cells contain hydrogen sulphide gas with chlorine, ammonia or any gas that will react with the hydrogen sulphide to form unobjectionable sulphur compounds.

It is still another object of my invention to make a cellular sponge rubber by incorporating within the rubber a chemical blowing agent, setting off the chemical blowing agent to form open channels within the rubber, and then gassing with an externally applied gas to provide a further expansion for the sponge mass.

It is still a further object of my invention to gas rubber with a gas that produces a flame proofing salt within the rubber.

As I have stated the gases which I employ may be externally injected into the rubber or they may be evolved by the decomposition or reaction of chemicals included within the rubber. Such chemicals and salts which decompose under heat or react to evolve these gases are well known to those skilled in the art. Nitrogen, for example, may be evolved from diazoaminobenzene or from the reaction of sodium nitrite and ammonium chloride. Ammonia may be evolved from ammonium salts such as ammonium carbonate and amino compounds. Chlorine may be evolved from certain unstable chlorine compounds such as the chlorates or from liquids containing concentrated chlorine such as the hydrochlorides.

The rubber mix is prepared by milling within rubber suitable quantities of sulphur and accelerator and blowing agent, when such is employed, in substantially the following proportions:

| | Parts |
|---|---|
| Rubber | 100 |
| Sulphur | 3 to 50 |
| Accelerator (captax which is mercaptobenzothiozole) | 2 |
| Blowing agent (diazoaminobenzene) | 10 |
| Ammonium carbonate | 10 |

The above ingredients are thoroughly mixed with the rubber on the mill and the rubber mix is then heated to decompose the blowing agent which evolve nitrogen and ammonia gases to effect the results set forth above.

When it is desired to make the novel sponge by the combined blow process I have set forth, I use the following mix:

| | Parts |
|---|---|
| Rubber | 100 |
| Sulphur | 6 |
| Accelerator-captax (mercaptobenzothiozole) | 2 |
| Carbon dioxide blowing agent | 10 |

The ingredients are thoroughly incorporated in the mix and it is essential that the accelerator be one that does not effect the vulcanization of the rubber at the temperatures at which the chemical blowing agent is set off.

The rubber mix is then subjected to sufficient heat to decompose the blowing agent and cause evolution of carbon dioxide gas which forms open cells or channels throughout the mass without stiffening the rubber. The sponge rubber is then subjected to ammonia gas under relatively low pressure, as for example 10 to 100 pounds per sq. ft. and the ammonia penetrates the rubber throughout, especially because of the communicating channels already formed in the rubber mass. On release of the gas pressure and subsequent heating, the ammonia gas in the rubber causes greatly increased expansion not only in the cells formed by the blowing agent but also in the rubber ungassed by the decomposed chemical blowing agent. The heat applied effects the vulcanization and set of the rubber and this set is hastened by the action of the ammonia gas which permeates through the mass of the rubber. It is desirable that a quick set be obtained after the final expansion has been effected.

In the manufacture of closed cell rubber I employ a mix similar to that above set forth.

The desired chemical blowing agent is carefully incorporated in the rubber and uniformly distributed through its mass. The rubber is then calendered and formed to shape and subjected to heat which acts to decompose the blowing agent and evolve nitrogen and ammonia therefrom, while at the same time effecting a partial cure for vulcanization of the rubber so as to set up the rubber sufficiently so that the evolved gas is maintained within the rubber in the form of closed cells. If the rubber is not properly set up to give it sufficient strength, the cells are ruptured and a sponge is formed.

The mixture of nitrogen and ammonia has many new and useful results. First, it acts as a good volumetric expanding agent. Second, the ammonia has an affinity for the free sulphur present and also the hydrogen sulphide gas with which it reacts to form ammonium sulphide, which has not the objectionable odor of hydrogen sulphide.

Third the ammonia acts as an accelerator for the rubber and assists in setting up the rubber far within the mass of the rubber where the heat externally applied difficultly reaches. Thus, the interior of the rubber mass is normally not given sufficient heat to effect a proper partial cure. Therefore, this interior does not have the strength necessary to maintain the desired closed cell structure and a sponge or broken celled interior often results. When the ammonia gas is set off uniformly throughout the rubber in admixture with the evolved nitrogen gas, it has a certain curing action on the rubber to give it this desirable feature of homogeneous cure.

In the manufacture of closed cell gas expanded rubber the use of a gas that reacts with the rubber to convert the rubber to a derivative thereof has special advantages. I have proposed gassing the rubber with chlorine gas. Chlorine readily enters the rubber when used alone or in combination with another gas such as nitrogen. It effects the desired expansion of the rubber in the form of a cellular mass. After the chlorine has been present in the rubber a short time it reacts therewith under favorable conditions to form a rubber chloride. The rubber chloride is formed first in the form of films that coincide with the cell walls. This tends to prevent the outward diffusion of the gas from the cells and in the case of the formation of a soft and flexible closed cell rubber this is an important factor. I thus propose to use an inflating gas that reacts with the rubber being gassed to form both a cellular structure and at the same time a modified rubber derivative.

This principle is particularly effective in the formation of expanded plastics and resins since in that case I can effect the final hardening or setting of the plastic while at the same time effecting its expansion by the use of a gas that reacts with or accelerates the conversion of the material being expanded.

My invention is not confined to the manufacture of expanded rubber but may be used with plastics or resins generally.

The various gases and combinations of gases I have set forth are made by way of example. The rubber composition may vary according to the rigidity or softness required. I intend to be limited not by the particular statements herein but only by the appended claims.

I claim:

1. In the manufacture of open celled gas expanded rubber, the steps of incorporating a chemical blowing agent within the rubber; heating the rubber to evolve gas from the chemical blowing agent, thus forming open cells and channels throughout the rubber; gassing the rubber with an externally applied gas; expanding the rubber; and vulcanizing the open celled rubber.

2. In the manufacture of open celled gas expanded rubber, the steps of incorporating a chemical blowing agent within the rubber; heating the rubber to evolve gas from the chemical blowing agent, thus forming open cells and channels throughout the rubber; gassing the rubber with externally applied ammonia; expanding the rubber; and vulcanizing the open celled rubber.

DUDLEY ROBERTS.